(12) United States Patent
Tamai et al.

(10) Patent No.: US 7,906,234 B2
(45) Date of Patent: Mar. 15, 2011

(54) ALL-SOLID-STATE LITHIUM SECONDARY CELL AND METHOD OF MANUFACTURING THE SAME

(75) Inventors: Hidekazu Tamai, Kyoto (JP); Tetsuo Nanno, Osaka (JP)

(73) Assignee: Panasonic Corporation, Osaka (JP)

( * ) Notice: Subject to any disclaimer, the term of this patent is extended or adjusted under 35 U.S.C. 154(b) by 1090 days.

(21) Appl. No.: 11/500,358

(22) Filed: Aug. 8, 2006

(65) Prior Publication Data

US 2007/0042265 A1    Feb. 22, 2007

(30) Foreign Application Priority Data

Aug. 18, 2005   (JP) ................................. 2005-237158

(51) Int. Cl.
*H01M 6/12* (2006.01)
*H01M 4/58* (2006.01)
(52) U.S. Cl. .................. 429/162; 429/231.95
(58) Field of Classification Search ............... 429/231.95
See application file for complete search history.

(56) References Cited

U.S. PATENT DOCUMENTS

| | | | |
|---|---|---|---|
| 2003/0075109 A1* | 4/2003 | Arai | 118/728 |
| 2004/0048149 A1* | 3/2004 | Gross et al. | 429/127 |
| 2007/0117017 A1* | 5/2007 | Sugiyama et al. | 429/231.95 |

FOREIGN PATENT DOCUMENTS

JP          06-231796           8/1994
WO    WO 2005057597 A1 *   6/2005

OTHER PUBLICATIONS

Machine translation, JP 06-231796, pub. date. Aug. 19, 1994.*

* cited by examiner

*Primary Examiner* — Dah-Wei D Yuan
*Assistant Examiner* — Adam A Arciero
(74) *Attorney, Agent, or Firm* — McDermott Will & Emery LLP

(57) ABSTRACT

An all-solid-state lithium secondary cell has a laminate, and a pair of external current collectors. The laminate is shaped into substantially a rectangular parallelepiped and is made of a positive electrode, a negative electrode, and a solid electrolyte between the positive and negative electrodes. The external current collectors are disposed at both ends of the laminate to support side faces of the laminate. One of the current collectors is connected to the positive electrode and the other to the negative electrode. A chamfered shape or an R-chamfered shape is provided at the edges and along the ridges of the laminate.

12 Claims, 13 Drawing Sheets

ALL-SOLID-STATE LITHIUM SECONDARY CELL AND METHOD OF MANUFACTURING THE SAME

BACKGROUND OF THE INVENTION

1. Field of the Invention

The present invention relates to an all-solid-state lithium secondary cell using a lithium ion-conducting solid electrolyte, and a method of manufacturing the cell.

2. Background Art

With downsizing of electronic equipment, there has been an increasing demand for cells having high energy density as its main power supply or backup power. Among these, a lithium ion secondary cell is drawing attention because of its higher voltage and energy density than a conventional cell using an aqueous solution as the electrolytic solution thereof. The lithium ion secondary cell includes: an oxide, such as $LiCoO_2$, $LiMn_2O_4$, and $LiNiO_2$, as a positive electrode active material; carbon, an alloy of Si and the like, and an oxide such as $Li_{4/3}Ti_{5/3}O_4$, as a negative electrode active material; and a solution dissolving a lithium salt in an organic solvent such as carbonate or ether as an electrolytic solution. For the electrolytic solution, a flammable substance classified in dangerous substance Class 4 is used. Additionally, deterioration of safety and damages to the equipment incorporating the cell caused by leakage of the electrolytic solution is concerned about.

To make up for such drawbacks of a lithium ion secondary cell, an all-solid-state lithium secondary cell using a solid electrolyte in place of an electrolytic solution is studied. The all-solid-state lithium secondary cell has a laminate including a solid electrolyte disposed between positive and negative electrodes as an electricity-generating element. External current collectors are disposed at both ends of the laminate so as to support the side faces of the laminate. This cell can avoid such a problem of the above-mentioned leakage because its electrolyte is not a liquid. Thus, the cell can be mounted directly on a wiring board, and the equipment incorporating the cell can be greatly downsized.

However, the current density of the all-solid-state lithium secondary cell is smaller than that of a lithium secondary cell using a non-aqueous solution. To overcome this problem, Japanese Patent Unexamined Publication No. H06-231796, for example, proposes a method of extending the electrode area by sandwiching a solid electrolyte between positive and negative electrodes, and laminating the combination. This method allows the cell to easily be mounted on a circuit board because the cell is shaped into substantially a rectangular parallelepiped, as well as improving the capacity and current density of the cell.

Each of the external current collectors are formed by applying a paste made of an electrically-conductive powder and a thickener onto, among all of the side faces of the laminate, each side of the laminate to which the end face of each electrode is exposed. A cupper powder, for example, is used as the electrically-conductive powder. Glass frit, for example, is used as the thickener. Thus, the external current collectors have a rounded shape. Because the external current collectors are formed in this manner, the external current collectors at the edges or along the ridges are likely to be thinner when the laminate is shaped into substantially a complete rectangular parallelepiped. In an extreme case, the edges or ridges of the cell can be exposed. The laminate having a portion which is partly exposed from the external current collectors leads to poor solder wettability of the external current collectors when the laminate is mounted on a circuit board, whereby causing mounting failures. The edges and ridges which are less resistant to external stress sometimes make weaker the structure of the laminate when it is dropped or the circuit board is warped in the reflow-soldering process.

SUMMARY OF THE INVENTION

An all-solid-state lithium secondary cell includes substantially a rectangular parallelepiped laminate made of a positive electrode, negative electrode, and solid electrolyte. External current collectors are disposed to support the side faces of the laminate. Round chamfered (R-chamfered) shapes or chamfered shapes are provided at the edges and along the ridges of the laminate. The R-chamfered shapes or chamfered shapes provided in the portion of the laminate to which external current collectors are applied to prevent any portion of the laminate from being exposed. The resultant structure can eliminate failures in mounting the cell on a circuit board which are caused by decreased solder wettability. Additionally, the laminate itself becomes a body having a shape free of edges, so that the resistance to external stress is increased. According to the present invention, in an all-solid-state lithium secondary cell having a shape of substantially rectangular parallelepiped with a high flexibility for mounting, the problems such as failures in mounting the cell on a circuit board or damages caused by external stress can be addressed. Thus, the present invention can provide an all-solid-state lithium secondary cell with high reliability.

DETAILED DESCRIPTION OF THE INVENTION

First Exemplary Embodiment

Figure 1:
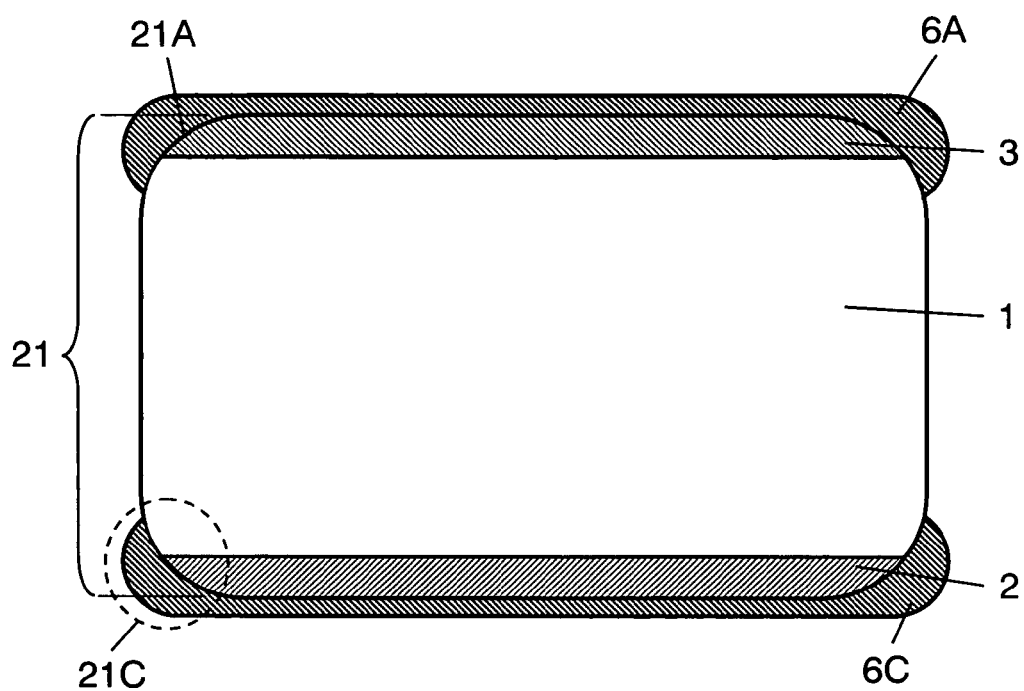
FIG. 1 is a sectional view of an all-solid-state lithium secondary cell in accordance with a first exemplary embodiment of the present invention.

FIG. 1 is a sectional view of an all-solid-state lithium secondary cell (hereinafter referred to as a cell) in accordance with the first exemplary embodiment of the present invention. Laminate 21 is made of positive electrode 2 containing a positive electrode active material, negative electrode 3 containing a negative electrode active material, and solid electrolyte 1 between positive electrode 2 and negative electrode 3. External current collectors 6A and 6C are disposed at both ends of laminate 21 so as to support the side faces of laminate 21. External current collectors 6A and 6C are connected to negative electrode 3 and positive electrode 2, respectively.

Generally used as the positive electrode active material constituting positive electrode 2 are compounds represented by a composition of $LiMPO_4$ (M being at least one selected from Mn, Fe, Co, and Ni). Other than these compounds, $LiCoO_2$, $LiNiO_2$, or modifications thereof can be used. The negative electrode active material constituting negative electrode 3 can be at least one selected from $FePO_4$, $Li_3Fe_2(PO_4)_3$, and $LiFeP_2O_7$.

For solid electrolyte 1, compounds represented by a composition of $Li_{1+X}M^m{}_X Ti^{IV}{}_{2-X}(PO_4)_3$ ($M^m$ being at least one kind of trivalent metal ion selected from Al, Y, Ga, In, and La, where $0 \leq X \leq 0.6$) are generally used. Other than these compounds, a lithium ionic conductor essentially consisting of $Li_{0.33}La_{0.56}TiO_3$ can be used as a sintered solid electrolyte. $Li_{1+X}M^m{}_X Ti^{IV}{}_{2-X}(PO_4)_3$ works as a negative electrode active material as well as a solid electrolyte, and generates no electrically inert layers even when sintered simultaneously with the positive electrode active material or negative electrode active material. For these reasons, $Li_{1+X}M^m{}_X Ti^{IV}{}_{2-X}(PO_4)_3$ is preferable.

Laminate 21 made of laminating the respective components is shaped into substantially a rectangular parallelepiped because mounting flexibility thereof is considered most important. On two faces among the six faces of this rectangular parallelepiped, which face to each other, to which each end face of positive electrode 2 and negative electrode 3 is exposed respectively, external current collectors 6A and 6C are disposed. Each of external current collectors 6A and 6B is made of an electrically-conductive powder and thickener. A copper powder, for example, is used as the electrically-conductive powder. Glass frit, for example, is used as the thickener.

Round chamfered (R-chamfered) shapes 21C are provided along ridge 21A of laminate 21. Though not shown, R-chamfered shapes 21C are also provided at the edges of laminate 21. In laminate 21, R-chamfered shapes 21C which are formed in the positions where external current collectors 6A and 6C are disposed eliminate the positions on which external current collectors 6A and 6C are applied in so thinner that laminate 21, which is a cell body itself, is exposed in these positions. This inhibits failures in mounting the cell on a circuit board caused by a decrease in solder wettability. Additionally, laminate 21 with no edge increases resistance to external stress. From the viewpoint of strength, R-chamfered shapes 21C can be provided along the ridges in parallel with the laminated direction of laminate 21.

Figure 2:
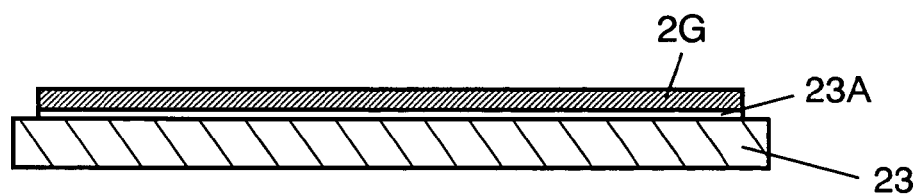
FIGS. 2 and 3 are sectional views illustrating a method of manufacturing the all-solid-state lithium secondary cell of FIG. 1.
Figure 3:
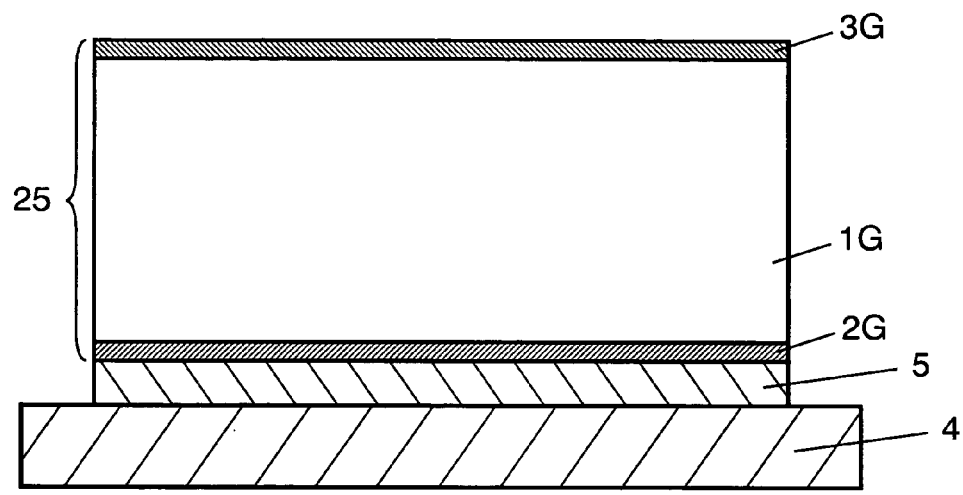
Figure 4:
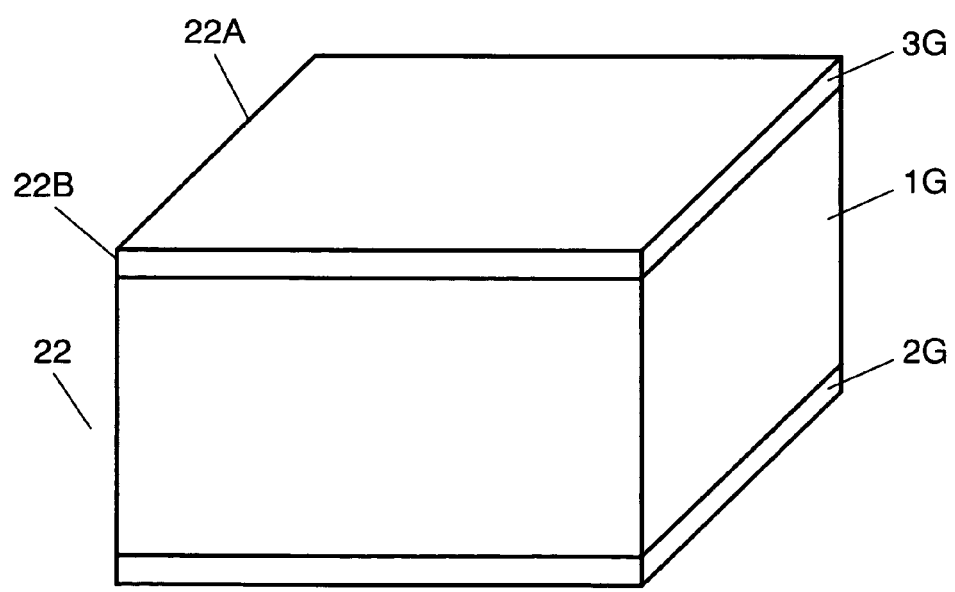
FIG. 4 is a perspective view of a green chip in a process of manufacturing the all-solid-state lithium secondary cell of FIG. 1.
Figure 5:
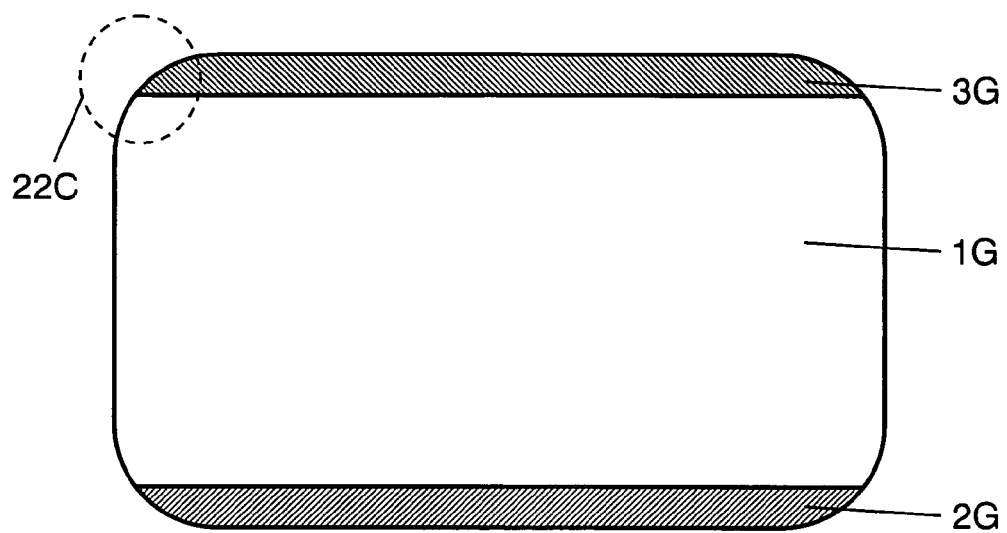
FIG. 5 is a sectional view illustrating the method of manufacturing the all-solid-state lithium secondary cell of FIG. 1.

Next, a method of manufacturing an all-solid-state lithium secondary cell (cell) of this embodiment is described with reference to FIGS. 2 though 5. FIGS. 2, 3, and 5 are sectional views for illustrating the method of manufacturing the cell of this exemplary embodiment. FIG. 4 is a perspective view thereof.

First, each of green sheets 1G of a solid electrolyte, green sheet 2G of a positive electrode active material, green sheet 3G of a negative electrode active material is prepared. A method of preparing green sheet 2G of the positive electrode active material is described with reference to FIG. 2. Slurry with an adjusted viscosity is prepared by adding the positive electrode active material, a resin, such as cellulose, and a plasticizer to an organic solvent such as butyl acetate. This slurry is applied to base 23 made of a resin film, for example, and dried at a low temperature. Finally, resulting dried green sheet 2G is released from base 23. At this time, preferably, release agent layer 23A is formed on the surface of base 23 beforehand.

Green sheet 3G of the negative electrode active material is also prepared by using the negative electrode active material in place of the positive electrode active material, in a similar manner to green sheet 2G. Green sheet 1G of the solid electrolyte is also prepared by using the solid electrolyte in place of the positive electrode active material in a similar manner to green sheet 2G.

Next, as shown in FIG. 3, polyester film 5 with an adhesive is applied on support 4, and green sheet 2G of the positive electrode active material formed on base 23 is placed on the polyester film. After base 23 is pressed against support 4, base 23 is peeled away from green sheet 2G.

After a plurality of layers of green sheet 1G of the solid electrolyte are placed on green sheet 2G in the similar manner, green sheet 3G of the negative electrode active material is laminated on the laminated layers of green sheet 1G. Thus, laminated sheet 25 made of green sheet 2G, green sheet 1G, and green sheet 3G is prepared.

Next, laminated sheet 25 is cut into pieces and polyester film 5 is peeled away to provide green chip 22 shown in FIG. 4. Then, edges 22B and ridges 22A of green chip 22 are ground to form R-chamfered shapes 22C as shown in FIG. 5. Thereafter, the green chip is washed, dried, and is subjected to so called "binder removal treatment" in a sintering furnace. Next, after the temperature of the furnace is further increased to sinter green chip 22, it is promptly cooled to room temperature. In this manner, laminate 21 is obtained.

Finally, a paste made of an electrically-conductive powder and thickener is applied to both ends of laminate 21 to support side faces thereof, and baked. In this manner, external current collectors 6A and 6C are formed as shown in FIG. 1. Thus, the cell of this embodiment is completed.

Figure 6:
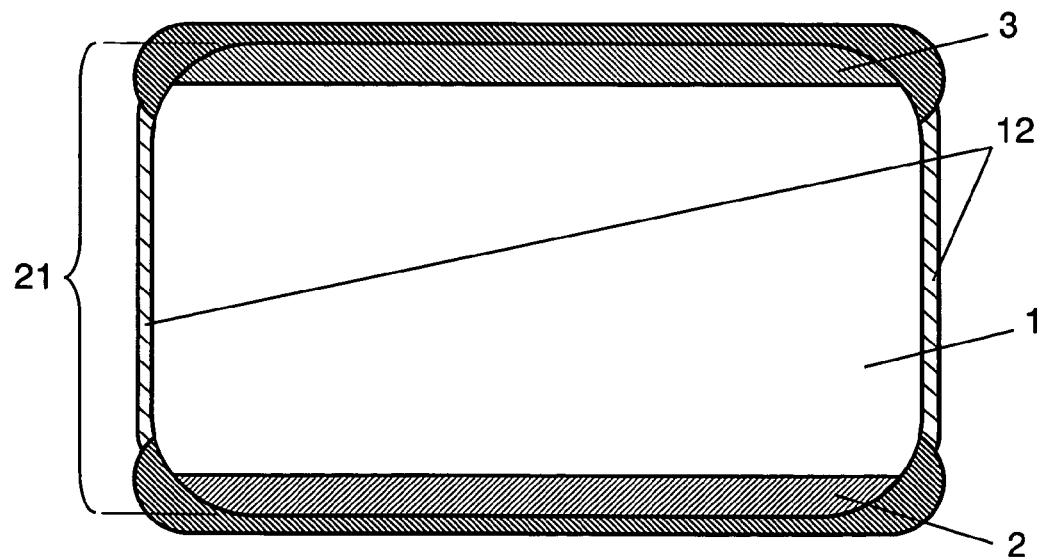
FIG. 6 is a sectional view of another all-solid-state lithium secondary cell in accordance with the first exemplary embodiment of the present invention.

Further, as shown in FIG. 6, preferably, portions exposed from external current collectors 6A and 6C of laminate 21 are sealed with seals 12 made of at least one of a glass and a resin. By blocking the direct contact between laminate 21, particularly solid electrolyte 1, and ambient air can minimize deterioration of the cell materials.

Preferably, after green chip 22 is prepared and before edges 22B and ridges 22A are R-chamfered, green chip 22 is dried to reduce the amount of plasticizer remained in green chip 22 (hereinafter, call as remaining amount). More preferably, the remaining amount is reduced in the range of 25 to 99 weight % (wt. %). The remaining amount can be obtained by gas chromatography or mass spectroscopy.

With an excessively large remaining amount, green chip 22 becomes sticky, so that the green sheets adhere to each other when R-chamfered shapes 21C are formed. This phenomenon increases the possibility of causing short circuits. On the other hand, with an excessively small remaining amount, increased brittleness of green chip 22 is likely to cause cracks and peeling in green chip 22 when R-chamfered shapes 21C are formed. Within the above range of the remaining amount, an all-solid-state lithium secondary cell can be produced with a high yield.

When R-chamfered shapes 22C are formed at edges 22B and along ridges 22A, edges 22B and ridges 22A are preferably ground with an abrasive. In this case, as the abrasive, are used materials such as alumina which have smaller influences on the cell characteristics. This increases mass productivity. More preferably, a powder made of the same material as solid electrolyte 1 is used as the abrasive. This is because even if a powder of abrasive which is made of the same material as solid electrolyte 1 is involved in the cell, it hardly causes such failures of short circuits or deterioration of characteristics.

Preferably, the curvature radius of R-chamfered shape 21C is smaller than 1/5 the length of laminate 21 in the laminated direction and 30 µm or larger. An excessively large curvature radius affects mounting stability, i.e. a feature of the rectangular parallelepiped. An excessively small curvature radius reduces the thickness of application of external current collectors 6A and 6C, thus providing fewer advantages of the present invention. Setting the curvature radius of R-chamfered shape 21C within the above range makes the advantages of the present invention apparent while mounting stability is kept high.

Figure 7:
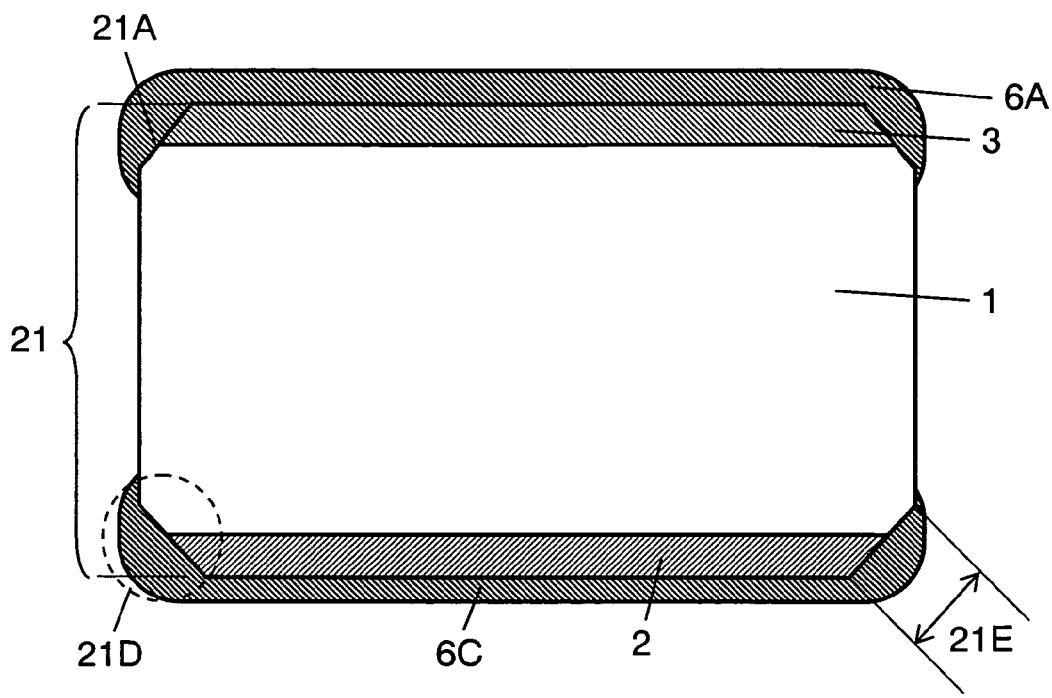
FIG. 7 is a sectional view of still another all-solid-state lithium secondary cell in accordance with the first exemplary embodiment of the present invention.

As shown in FIG. 7, in place of R-chamfered shapes 22C, chamfered shapes 21D can be formed at the edges and along ridges 21A of laminate 21. Like R-chamfered shapes 22C, chamfered shapes 21D can be formed by grinding. In this case, preferably, width 21E of chamfered shapes 21D is smaller than 1/4 the length of laminate 21 in the laminated direction and 45 µm or larger. This reason is the same as the reason of the preferable range of the curvature radius of R-chamfered shape 21C.

Next, the advantages of this exemplary embodiment are described using specific examples. Prepared are a solid electrolyte powder having a composition represented by $Li_{1.3}Al_{0.3}Ti_{1.7}(PO_4)_3$, a positive electrode active material powder represented by $LiCoPO_4$, and a negative electrode active material powder represented by $Li_3Fe_2(PO_4)_3$. Then, to each of these powders, polyvinylbutyral resin is added as a binder, n-butylacetate as a solvent, and dibutylphthalate as a plasticizer. Each of these mixtures is mixed with zirconia balls by a ball mill for 24 hours to provide slurry made of a solid electrolyte, a slurry made of positive electrode active material, and a slurry made of negative electrode active material, respectively.

Next, as shown in FIG. 2, the positive electrode active material slurry is applied to base 23 essentially consisting of a polyester resin using a doctor blade, and dried, to provide green sheet 2G of the positive electrode active material 3 µm thick. On the surface of base 23, release agent layer 23A essentially consisting of Si is formed beforehand. In a similar manner, green sheet 1G of the solid electrolyte 25 µm thick and green sheet 3G of the negative electrode active material 5 µm thick are prepared.

Next, as shown in FIG. 3, polyester film 5 with an adhesive is applied on support 4. Green sheet 2G formed on base 23 is placed on the polyester film. After a pressure of 80 kg/cm² is applied to these materials at an ambient temperature of 70° C., base 23 is peeled away from green sheet 2G. After 40 layers of green sheet 1G of the solid electrolyte are laminated on green sheet 2G in a similar manner, green sheet 3G of the negative electrode active material is laminated on the laminated layers of green sheet 1G. Thus, laminated sheet 25 approx. 1 mm thick made of green sheet 2G, green sheet 1G, and green sheet 3G is prepared.

Next, as shown in FIG. 4, laminated sheet 25 is cut into pieces and polyester film 5 with an adhesive is peeled away to provide green chip 22. Green chip 22 measures 1.0 mm long, 1.0 mm wide, and 1.0 mm high.

Next, green chip 22 is dried at a temperature of 170° C. for 30 minutes to make the remaining amount of the plasticizer to 25 wt. %. Thereafter, as shown in FIG. 5, R-chamfered shapes 22C, each having a curvature radius of approx. 30 µm, are formed by grinding edges 22B and ridges 22A with an end-face grinder using alumina as an abrasive. After the green chip is washed and dried, the binder thereof is removed in a sintering furnace at an ambient temperature of 400° C. for 5 hours. After the green chip is sintered at a maximum temperature of 950° C., it is cooled promptly to room temperature.

Then, after a paste made of gold and glass frit is applied to positive electrode 2 and negative electrode 3 of laminate 21 obtained by sintering green chip 22, the chip is heat-treated at an ambient temperature of 600° C. for one hour to provide external current collectors 6A and 6C, as shown in FIG. 1.

Laminate 21 without consideration of R-chamfered shapes 21C measures 0.9 mm long, 0.9 mm wide, and 0.9 mm high. Chamfered shape 21C has no dimensional change before and after sintering. On the assumption that all portions of laminate 21 are made of $Li_{1.3}Al_{0.3}Ti_{1.7}(PO_4)_3$, the packing density of laminate 21 is approx. 85%. Observation of a ground section of laminate 21 with a scanning electron microscope (SEM) shows positive electrode 2 and negative electrode 3 are approx. 1 µm and 2 µm, respectively. In this manner, the all-solid-state lithium secondary cells of sample A are obtained.

Figure 8:
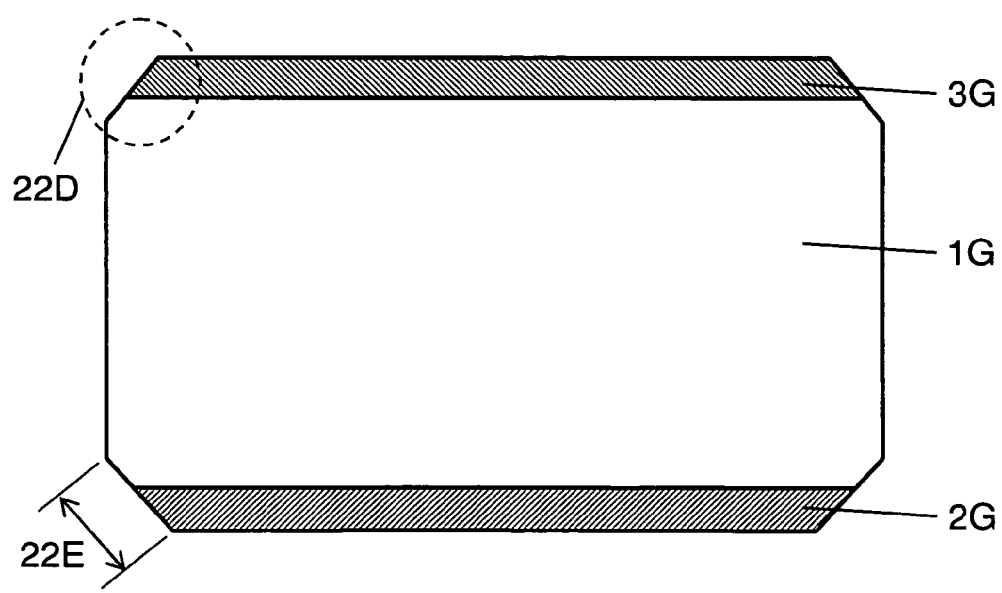
FIG. 8 is a sectional view illustrating a method of manufacturing the all-solid-state lithium secondary cell of FIG. 7.

Next, a procedure of producing all-solid-state lithium secondary cells (cells) of sample B is described. After green chip 22 shown in FIG. 4 is produced and dried in a similar manner to sample A, chamfered shape 22D, as shown in FIG. 8, having a chamfered width of 45 µm is formed by grinding edges 22B and ridges 22A with the end-face grinder using alumina as an abrasive. After that, with the steps similar to sample A, the cell of sample B is obtained. Laminate 21 of sample B without consideration of the chamfered shapes is the same as sample A in dimensions, packing density, and thickness of positive electrode 2 and negative electrode 3. Chamfered shape 22D has no dimensional change before and after sintering.

In production of the cells of sample C, the procedure of producing sample A is performed except that R-chamfered shapes 21C are formed immediately after green chips 22 are sintered.

In production of the cells of sample D, the procedure of producing sample B is performed except that chamfered shapes 21D are formed immediately after green chips 22 are sintered.

In production of the cells of samples E through H, the same procedure of producing sample A is performed except that R-chamfered shapes 22C are formed in a manner that the curvature radii thereof are 20, 100, 180, and 200 µm, respectively.

In production of the cells of samples J through M, the same procedure of producing sample B is performed except that chamfered shapes 22D are formed in a manner that the chamfered widths 22E thereof are 20, 100, 180, and 200 μm, respectively.

In production of the cells of samples N through R, the same procedure of producing sample C is performed except that R-chamfered shapes 21C are formed in a manner that the curvature radiuses are 20, 100, 180, and 200 μm, respectively.

In production of the cells of samples S through V, the same procedure of producing sample D is performed except that chamfered shapes 21D are formed in a manner that chamfered widths 21E thereof are 20, 100, 180, and 200 μm, respectively.

Figure 9:
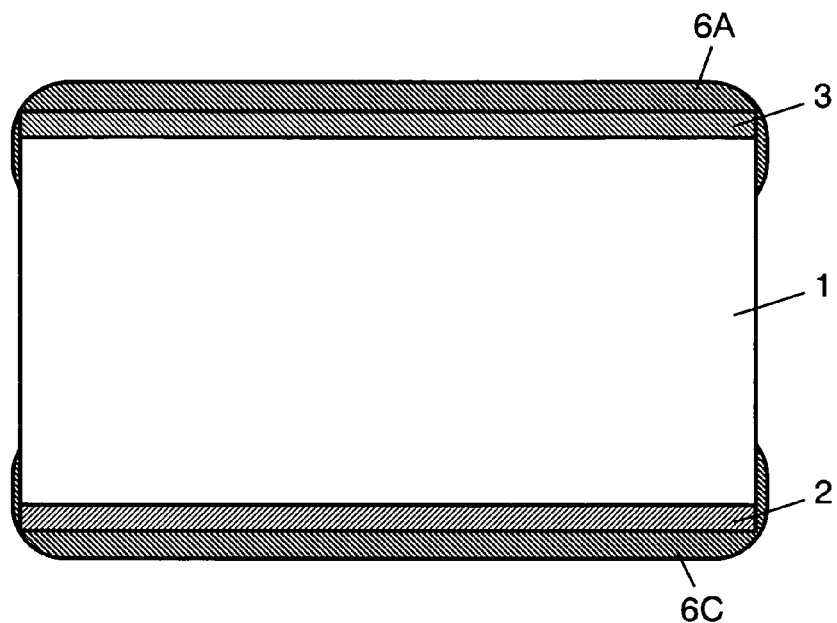
FIG. 9 is a sectional view of an all-solid-state lithium secondary cell of comparative example A.

For comparison with these samples, comparative example A of laminates without any chamfering at the edges or along ridges thereof as shown in a schematic sectional view of FIG. 9 is produced.

Figure 10:
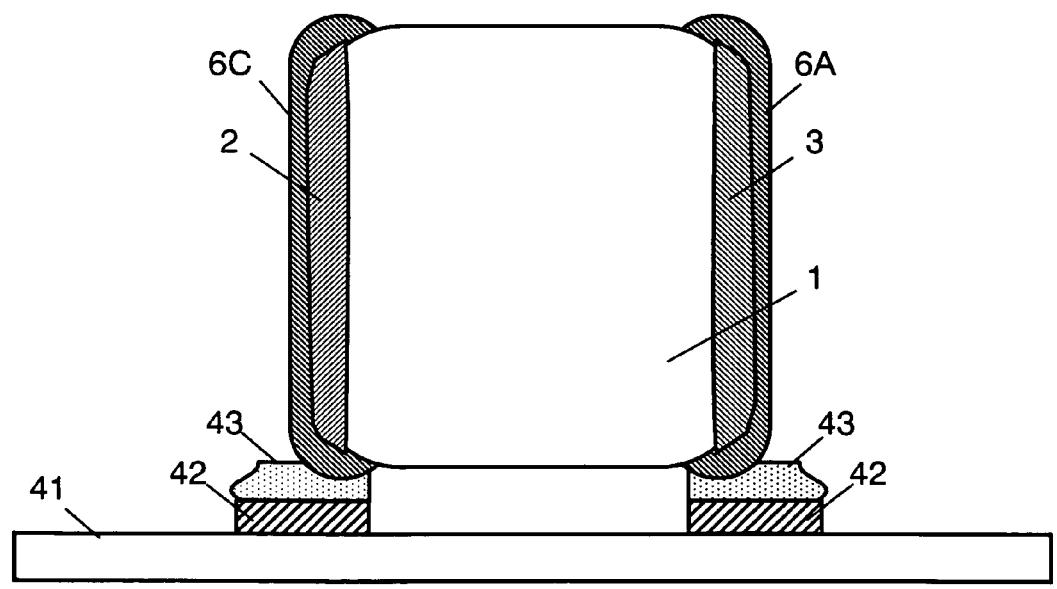
FIG. 10 is a sectional view illustrating a testing method of mounting the all-solid-state lithium secondary cell of the first exemplary embodiment on a circuit board.

Three point bending tests are conducted on these cells according to JIS-R1601 to measure transverse-rupture-strengths (hereinafter, called as transverse) thereof. Defective fractions of mounting are also measured. The mounting tests are conducted on external current collectors 6A and 6C after the samples of the cells are connected to wiring patterns 42 on glass epoxy boards 41 (wiring boards) with solder 43, as shown in FIG. 10. After connection, the patterns are heated to a temperature of 270° C. and impedance between wiring patterns 42 is analyzed. Then, the samples exhibiting impedances equal to or higher than a threshold of 1 kΩ are determined as defectively mounted ones. In this manner, defective fractions of mounting in samples, 100 pieces each, are calculated. Tables 1 and 2 show the results.

TABLE 1

| Sample | Curvature Radius (μm) | Chamfering | Transverse (Mpa) | Defective fraction (%) |
|---|---|---|---|---|
| E | 20 | Before sintering | 105 | 0 |
| A | 30 | | 131 | 0 |
| F | 100 | | 139 | 0 |
| G | 180 | | 143 | 0 |
| H | 200 | | 153 | 0 |
| N | 20 | After sintering | 94 | 0 |
| C | 30 | | 120 | 0 |
| P | 100 | | 125 | 0 |
| Q | 180 | | 132 | 0 |
| R | 200 | | 142 | 0 |
| Comparative A | — | — | 64 | 3 |

TABLE 2

| Sample | Chamfered width (μm) | Chamfering | Transverse (Mpa) | Defective fraction (%) |
|---|---|---|---|---|
| J | 35 | Before sintering | 96 | 0 |
| B | 45 | | 116 | 0 |
| K | 150 | | 122 | 0 |
| L | 225 | | 131 | 0 |
| M | 250 | | 125 | 0 |
| S | 35 | After sintering | 84 | 0 |
| D | 45 | | 112 | 0 |
| T | 150 | | 113 | 0 |
| U | 225 | | 114 | 0 |
| V | 250 | | 119 | 0 |
| Comparative A | — | — | 64 | 3 |

As shown in Tables. 1 and 2, providing R-chamfered shapes 21C or chamfered shapes 21D at the edges or along ridges 21A makes the transverses of the cells of all the samples higher than that of comparative sample A. Providing R-chamfered shapes 22C or chamfered shapes 22D before sintering green chips 22 further increases the transverses. In other words, resistance to external stress increases. It is considered that the structures of R-chamfered shapes 22C and chamfered shapes 22D are smoothed more uniformly in the sintering stage, whereby the transverses are increased.

However, in samples E and N that have R-chamfered shapes 21C having a curvature radius of 20 μm, and also in samples J and S having chamfered width 21E of 35 μm, transverses so high as expected are not obtained. On the other hand, in samples H and R having a curvature radius exceeding ⅕ the thickness (0.9 mm) of laminate 21 in the laminated direction, sufficient transverses are obtained; the thickness is measured without taking R-chamfered shapes 21C into consideration. However, the small planar portion thereof makes still standing difficult. This is the same in samples M and V having chamfered width 21E exceeding ¼ of the thickness of laminate 21 in the laminated direction; the thickness is measured without taking chamfered shapes 21D into consideration. Still standing property is one of essential conditions for mounting the cell on a circuit board. For this reason, the curvature radius of laminate 21 is preferably ⅕ the thickness of laminate 21 in the laminated direction; the thickness is measured without taking R-chamfered shapes 21C into consideration. For the same reason, chamfered width 21E is preferably ¼ the thickness of laminate 21 in the laminated direction; the thickness is measured without taking chamfered shapes 21D into consideration.

As shown in Tables 1 and 2, all of the cells which have R-chamfered shapes 21C or chamfered shapes 21D at the edges or along ridges 21A provide a defective fraction of 0%. In contrast, comparative sample A which has no R-chamfered shapes 21C or no chamfered shapes 21D at the edges or along ridges 21A provides a defective fraction of 3%. It is considered that external current collector 6A or 6C is formed thinner at the edges or along the ridges and locally exposes the cell bodies, which results decrease in solder wettability and leads to mounting failures.

Next, advantages of seals 12 shown in FIG. 6 are described. In production of sample W, a paste made of glass frit is applied to the portions not covered with external current collectors 6A and 6C of cells of sample A, and sintered at a temperature of 400° C. in atmospheric air for one hour, to provide seals 12. In this manner, cells of samples W are obtained.

In production of sample X, a paste made of glass frit is applied to the portions not covered with external current collectors 6A and 6C of cells of sample B, and sintered at a temperature of 400° C. in atmospheric air for one hour to provide seals 12. In this manner, cells of samples X are obtained.

In production of sample Y, a water-resistant epoxy resin is applied to portions not covered with external current collectors 6A and 6C of cells of sample A to provide seals 12. In this manner, cells of sample Y are obtained.

After these cells in the charged state are stored in a thermostatic humidistat bath at a temperature of 60° C. and a humidity of 85% for 30 days, each cell is discharged. The discharge capacity of each cell is measured. Table 3 shows the results. The cells are charged to 2.2 V at a dew point of −50° C. and at an ambient temperature of 25° C. at a constant current and discharged to 1.0 V.

TABLE 3

| Sample | Chamfering at edges and along ridges | Seal | Discharge capacity (μAh) |
|---|---|---|---|
| A | R-chamfered | — | 1.0 |
| W | | Glass | 1.4 |
| Y | | Epoxy resin | 1.3 |
| B | Chamfered | — | 1.0 |
| X | | Glass | 1.4 |

In contrast to samples A and B without seals 12, it is confirmed that samples W and X with seals 12 made of glass frit have a larger discharge capacity after storage and thus excellent storage characteristics. This advantage is also confirmed in sample Y using an epoxy resin for seals 12. In this manner, seals 12 made of chemically stable material can increase the storage characteristics of the cells of this exemplary embodiment.

Second Exemplary Embodiment

Figure 11:
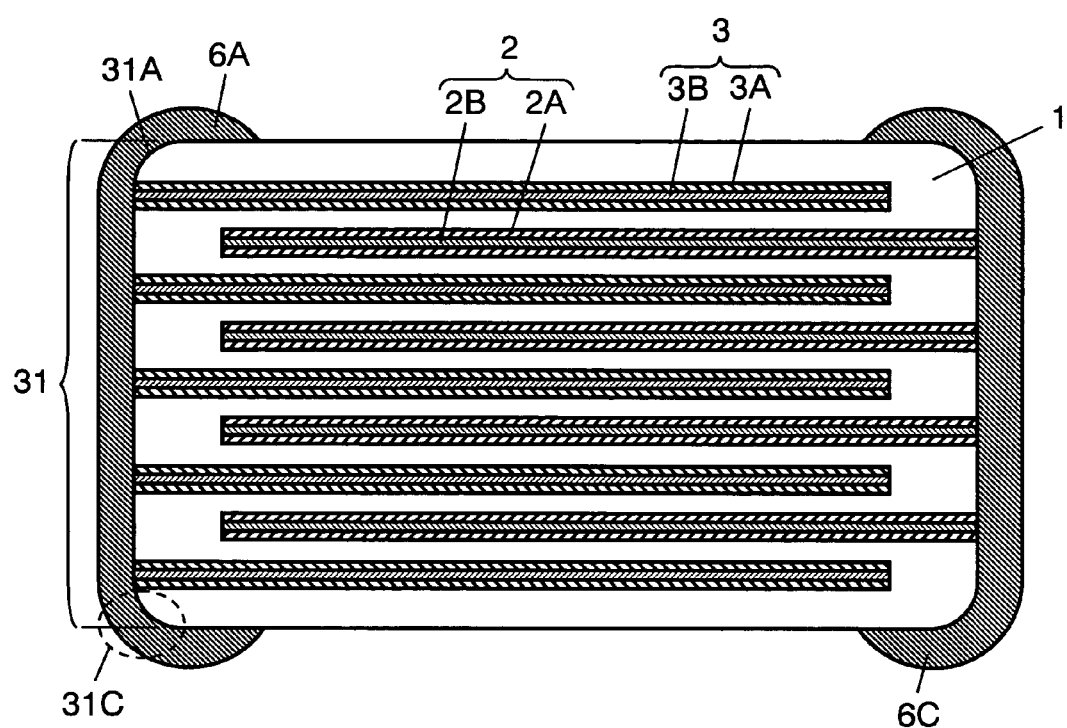
FIG. 11 is a sectional view of an all-solid-state lithium secondary cell in accordance with a second exemplary embodiment of the present invention.

FIG. 11 is a sectional view of an all-solid-state lithium secondary cell (cell) in accordance with the second exemplary embodiment of the present invention. Laminate 31 is shaped into substantially a rectangular parallelepiped by laminating units, each made of positive electrode 2 containing a positive electrode active material, negative electrode 3 containing a negative electrode active material, and solid electrolyte 1 between positive electrode 2 and negative electrode 3. A plurality of positive electrodes 2 and a plurality of negative electrodes 3 are exposed on the opposite faces of laminate 31. External current collectors 6A and 6C are connected to negative electrodes 3 and positive electrodes 2, respectively. In other words, external current collectors 6A and 6C are disposed at both ends of laminate 31 to support the side faces of laminate 31. Providing a plurality of elemental units, each made of positive electrode 2, negative electrode 3, and solid electrolyte 1, in laminate 31 can prevent a decrease in current density, which is a basic problem of all-solid-state lithium secondary cells.

Positive electrode 2 is preferably structured in a manner that positive electrode active material layers 2A sandwich both surfaces of positive electrode current collector layer 2B. Negative electrode 3 is preferably structured in a similar manner so that negative electrode active material layers 3A sandwich both surfaces of positive electrode current collector layer 3B. In other words, preferably, positive electrode 2 is structured in a manner that positive electrode active material layers 2A are provided on both surfaces of positive current collector layer 2B, and negative electrode 3 is structured in a manner that negative electrode active material layers 3A are provided on both surfaces of positive current collector layer 3B. This is because providing current collector layers 2B and 3B that can be core materials in positive electrodes 2 and negative electrodes 3 can improve current collecting property and mechanical strength. This structure can be applied to laminate 21 of the first exemplary embodiment. In other words, a positive electrode current collector layer and a negative electrode current collector layer can be formed on the faces on which external current collectors 6A and 6B are to be formed.

Materials desirable for positive electrode current collector 2B and negative electrode current collector 3B are those do not react with positive and negative active materials and can be heat-treated together with positive and negative active materials and solid electrolyte 1 in the same atmosphere. When this requirement is met, no electrochemically inert interface is generated. Specifically, platinum, gold, silver, palladium, cupper, cobalt, stainless steel, and the like are applicable. However, because such a metal as copper, nickel, cobalt, stainless steel, and silver is highly reactive to the active materials, it is essential to control sintering atmosphere in the sintering step. Therefore, platinum, gold, or palladium is most preferable. Preferably, current collectors 2B and 3B are inserted into the centers of layers 2A and 3A made of the positive electrode active material and the negative electrode active material, respectively.

R-chamfered shapes 31C are provided along ridges 31A of laminate 31. Though not shown, R-chamfered shapes 21C are provided at the edges of laminate 31. Providing R-chamfered shapes 31C in positions having external current collectors 6A and 6C in laminate 31 in this manner eliminates portions where thin application of external current collectors 6A and 6C exposes laminate 21, a cell body. This chamfering inhibits failures in mounting the cell on a circuit board caused by a decrease in solder wettability. Laminate 31 without edges increases resistance to external stress. In a similar manner to the first exemplary embodiment, the chamfered shapes can be provided along ridges 31A and at the edges of laminate 31.

Figure 15:
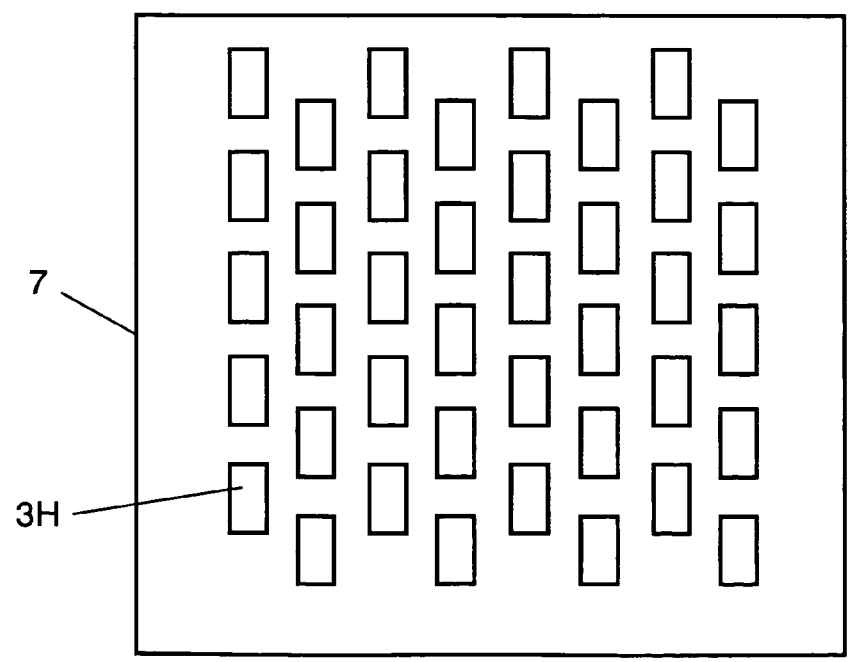
Figure 16:
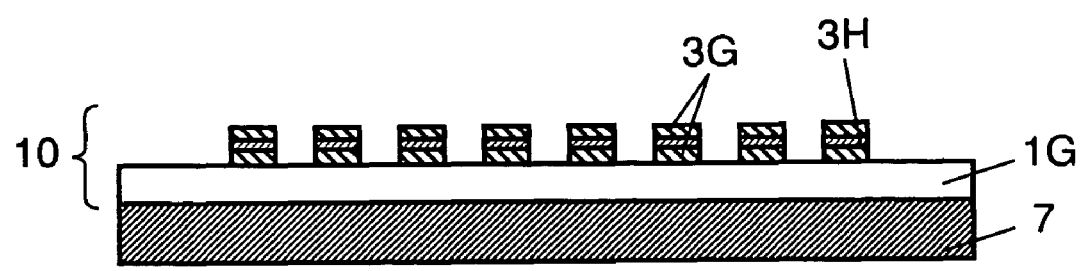
FIGS. 16 through 18 are sectional views illustrating the method of manufacturing the all-solid-state lithium secondary cell of FIG. 11.
Figure 17:
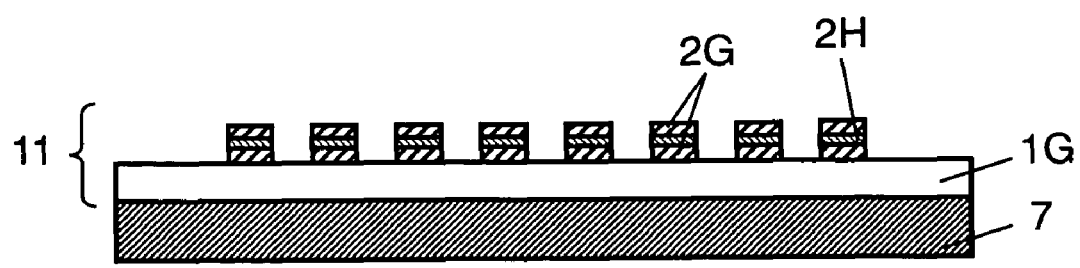
Figure 18:
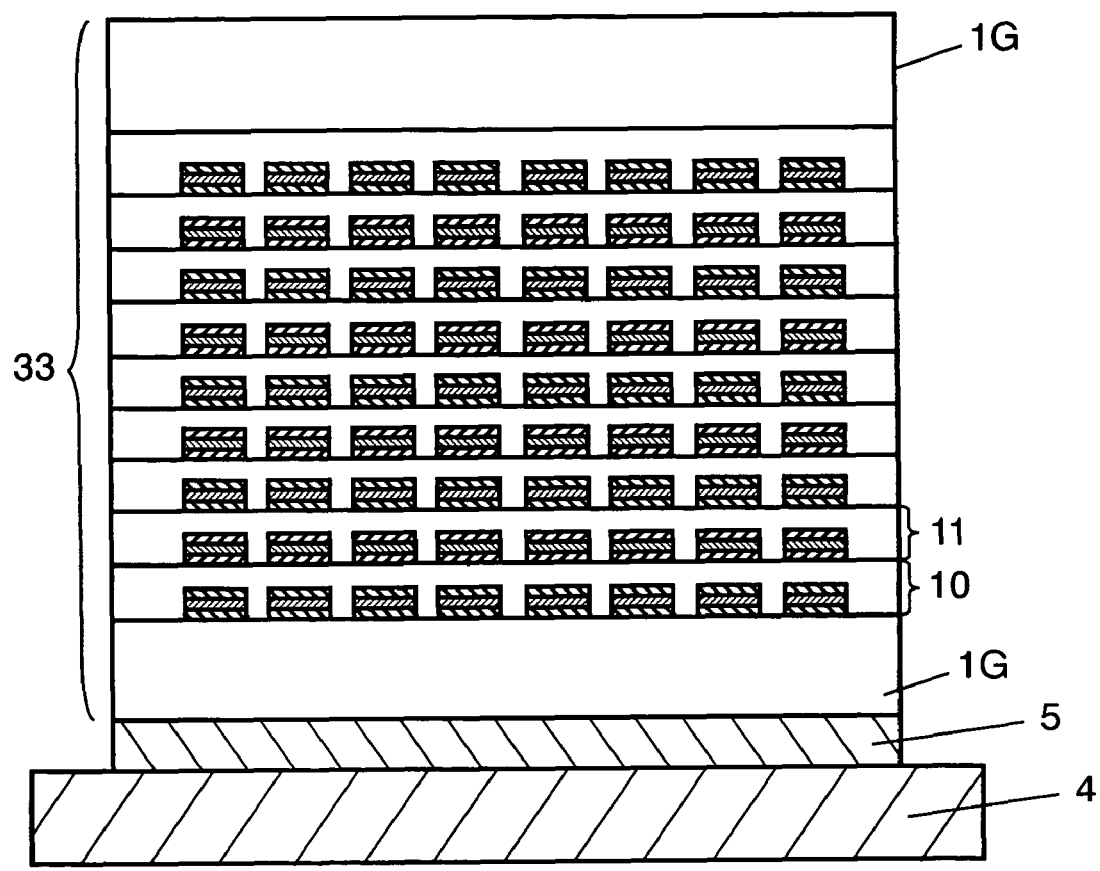
Figure 19A:
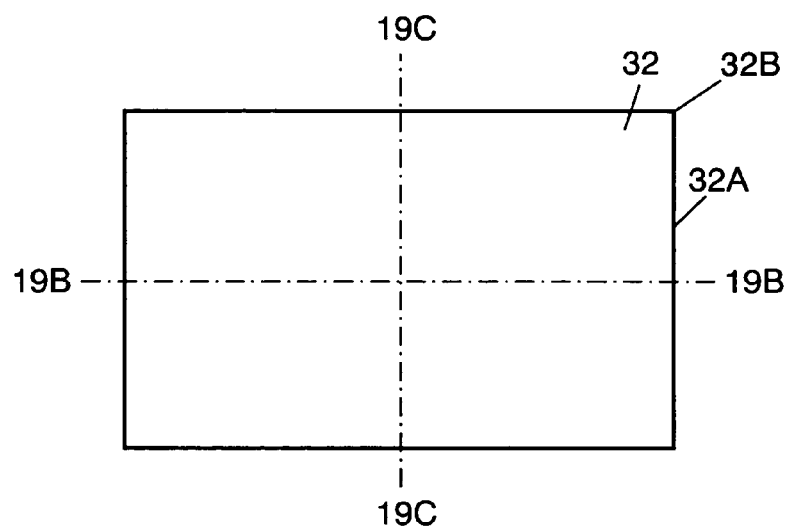
FIG. 19A is a plan view of a green chip in a process of manufacturing the all-solid-state lithium secondary cell of FIG. 11.
Figure 19B:
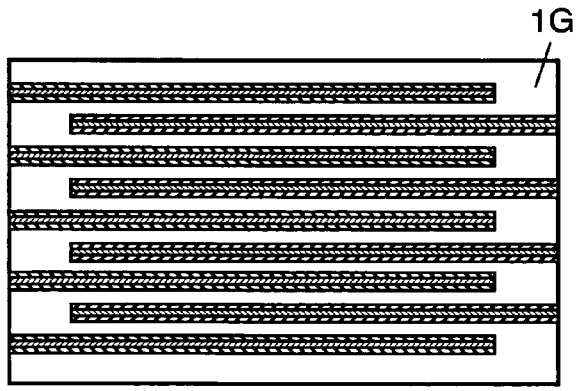
FIG. 19B is a sectional view of the green chip of FIG. 19A taken on face 19B-19B.
Figure 19C:
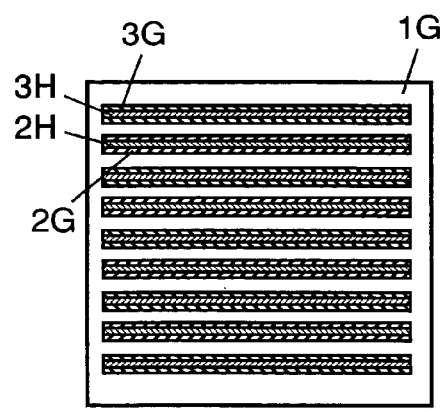
FIG. 19C is a sectional view of the green chip of FIG. 19A taken on face 19C-19C.
Figure 20:
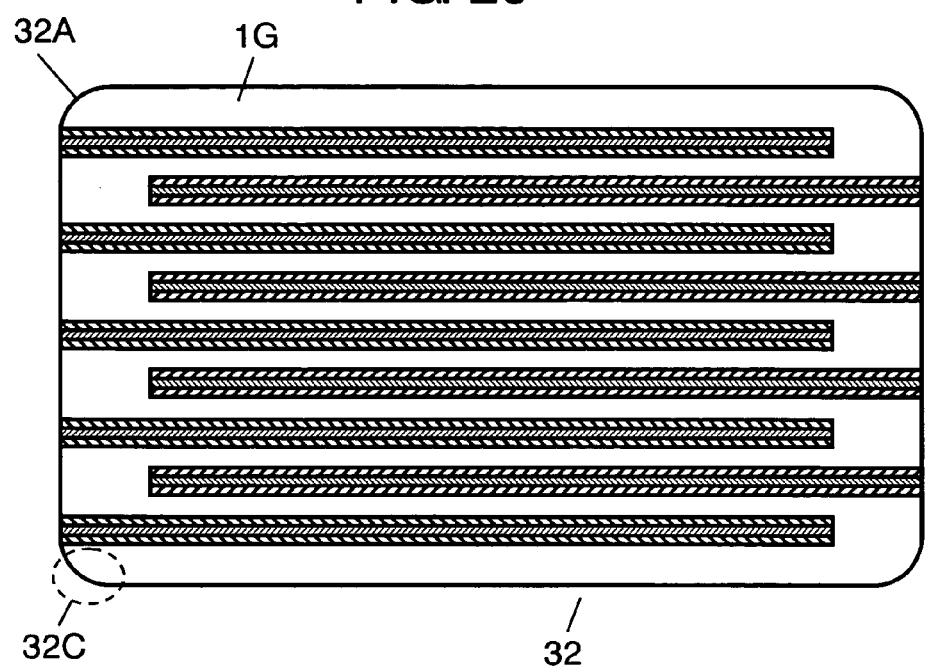
FIG. 20 is a sectional view illustrating the method of manufacturing the all-solid-state lithium secondary cell of FIG. 11.

Next, a method of manufacturing the all-solid-state lithium secondary cell (cell) of this exemplary embodiment is described with reference to FIGS. 12 through 20. FIGS. 12 through 15 are schematic plan views showing green sheets of the positive electrode active material, positive electrode current collector, negative electrode active material, and negative electrode current collector, respectively. FIGS. 16 and 17 are sectional views of green sheets of the negative electrode laminate and positive electrode laminate, respectively. FIG. 18 is a sectional view of a laminated sheet. FIG. 19A is a plan view of a green chip. FIGS. 19B, 19C, and 20 are sectional views thereof.

Figure 12:
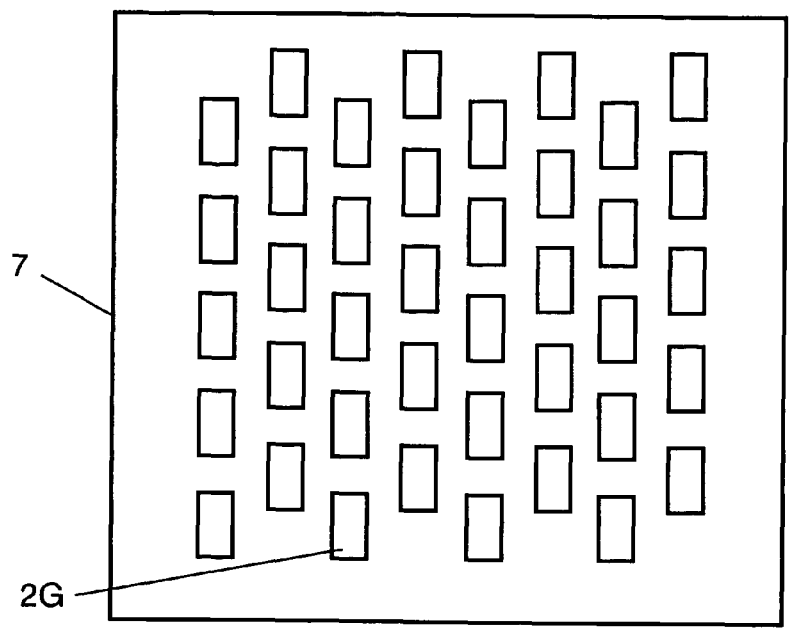
FIGS. 12 through 15 are plan views illustrating a method of manufacturing the all-solid-state lithium secondary cell of FIG. 11.
Figure 13:
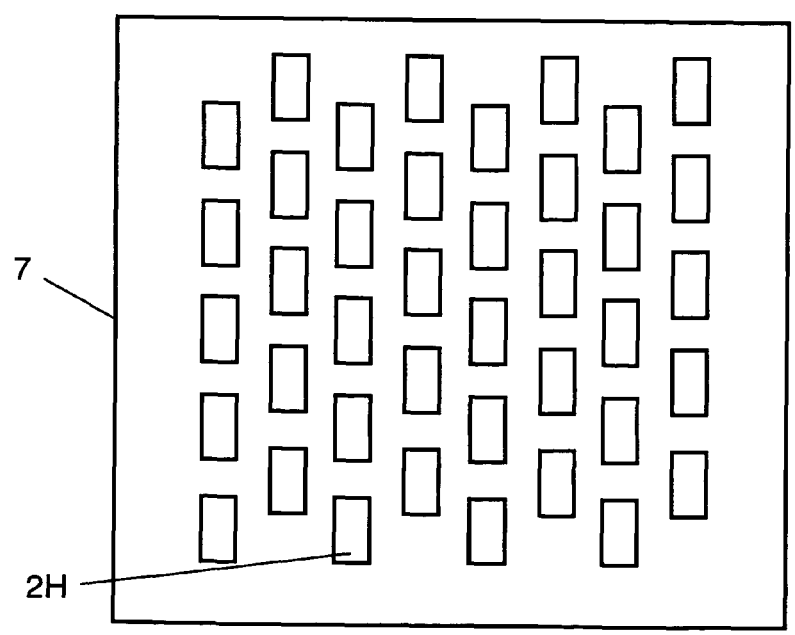

First, positive electrode active material slurry similar to that of the first exemplary embodiment is silk-screened on carrier film 7 similar to base 23 of the first exemplary embodiment to form a hound's tooth check, as shown in FIG. 12. Thus, green sheets 2G made of the positive electrode active material are produced. On the other hand, current collector paste slurry essentially consisting of palladium is silk-screened on carrier film 7 to form a hound's tooth check at the same pitch as in the case of the positive electrode active material slurry, as shown in FIG. 13. Thus, green sheets 2H made of the positive electrode current collector are produced.

Figure 14:
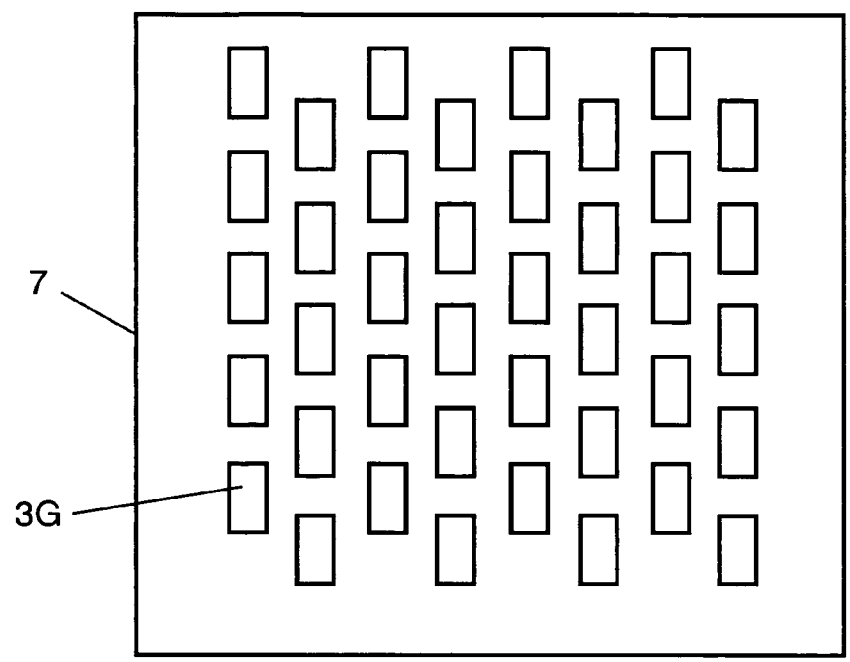

Next, negative electrode active material slurry similar to that of the first exemplary embodiment is silk-screened on carrier film 7 to form a hound's tooth check, as shown in FIG. 14. Thus, green sheets 3G made of the negative electrode active material are produced. On the other hand, current collector paste slurry essentially consisting of palladium is silk-screened on carrier film 7 to form a hound's tooth check at the same pitch as in the case of the negative electrode active material slurry, as shown in FIG. 15. Thus, green sheets 3H made of the negative electrode current collector are produced.

Though not shown, solid electrolyte slurry similar to that of the first exemplary embodiment is applied to carrier film 7 and dried, to provide green sheet 1G of the solid electrolyte.

Using these green sheets, negative electrode laminate green sheet 10 and positive electrode laminate green sheet 11 are produced as shown in FIGS. 16 and 17. First, as shown in FIG. 16, green sheet 3G of the negative electrode active material is placed on green sheet 1G of the solid electrolyte formed on carrier film 7 and the resulting laminate is pressurized. Thereafter, carrier film 7 in contact with green sheet 3G is peeled away from green sheet 3G, and green sheet 3G is provided on green sheet 1G. In a similar manner, green sheet 3H of the negative electrode current collector is provided on green sheet 3G, and green sheet 3G is further provided on green sheet 3H. Thus, negative electrode laminate green sheet 10 is produced.

On the other hand, as shown in FIG. 17, green sheet 2G of the positive electrode active material is placed on green sheet 1G of the solid electrolyte formed on carrier film 7, and the resulting laminate is pressurized. Thereafter, carrier film 7 in contact with green sheet 2G is peeled away from green sheet 2G, and green sheet 2G is provided on green sheet 1G. In a similar manner, green sheet 2H of the positive electrode current collector is provided on green sheet 2G, and green sheet 2H of the positive electrode current collector is further provided on green sheet 2G. Thus, positive electrode laminate green sheet 11 is produced.

Next, using negative electrode laminate green sheet 10 and positive electrode laminate green sheet 11, laminated sheet 33 as shown in FIG. 18 is produced. Polyester film 5 with an adhesive is applied on support 4. Green sheet 1G of the solid electrolyte formed on carrier film 7 is place on the polyester film. Negative electrode laminate green sheet 10 formed on carrier film 7 is further placed on green sheet 1G, and the resulting laminate is pressurized. Thereafter, carrier film 7 is peeled away from positive electrode laminate green sheet 10. Positive electrode laminate green sheet 11 formed on carrier film 7 is further placed on negative laminate green sheet 10, and the resulting laminate is pressured. Thereafter, carrier film 7 is peeled away from positive electrode laminate green sheet 11.

Theses operations are repeated a predetermined number of times and, finally, negative electrode laminate green sheet 10 and green sheet 1G are laminated in this order. Thus, is obtained laminated sheet 33 in which patterns, each made of green sheet 3H, green sheet 3G, green sheet 1G, green sheet 2G, and green sheet 2H, are repeated.

Next, laminated sheet 33 is cut in parallel with the longitudinal direction of each green sheet 2G in positions between green sheets 2G, and further cut into pieces so that one end face of green sheets 2G and one end face of green sheets 3G are exposed. FIG. 19A is a top view of green chip 32 in which polyester film 5 is peeled away from a piece cut up in this manner. FIG. 19B is a schematic sectional view taken on line 19B-19B of FIG. 19A. FIG. 19C is a schematic sectional view taken on line 19C-19C of FIG. 19A. As obvious from FIG. 19B, the section of green sheets 2G and 2H for the positive electrode, and the section of green sheets 3G and 3H for the negative electrode are exposed on one side of each end face (cut surface).

Then, R-chamfered shapes 32C are formed, as shown in FIG. 20, by grinding edges 32B and ridges 32A of green chip 32. Thereafter the green chip is washed, dried, and the binder thereof is removed in a sintering furnace. Next, after the temperature is further increased to sinter green chip 32, it is promptly cooled to room temperature. Thus, laminate 31 of FIG. 11 is obtained. In laminate 31, solid electrolyte 1, negative electrode 3, solid electrolyte 1, positive electrode 2, solid electrolyte 1, negative electrode 3, and solid electrolyte 1 form one elemental unit.

Finally, a paste made of an electrically-conductive powder and thickener is applied to both ends of laminate 31 to support the side faces of laminate 31, and baked. In this manner, external current collectors 6A and 6C are formed. Thus, the cell of this exemplary embodiment is completed.

Figure 21:
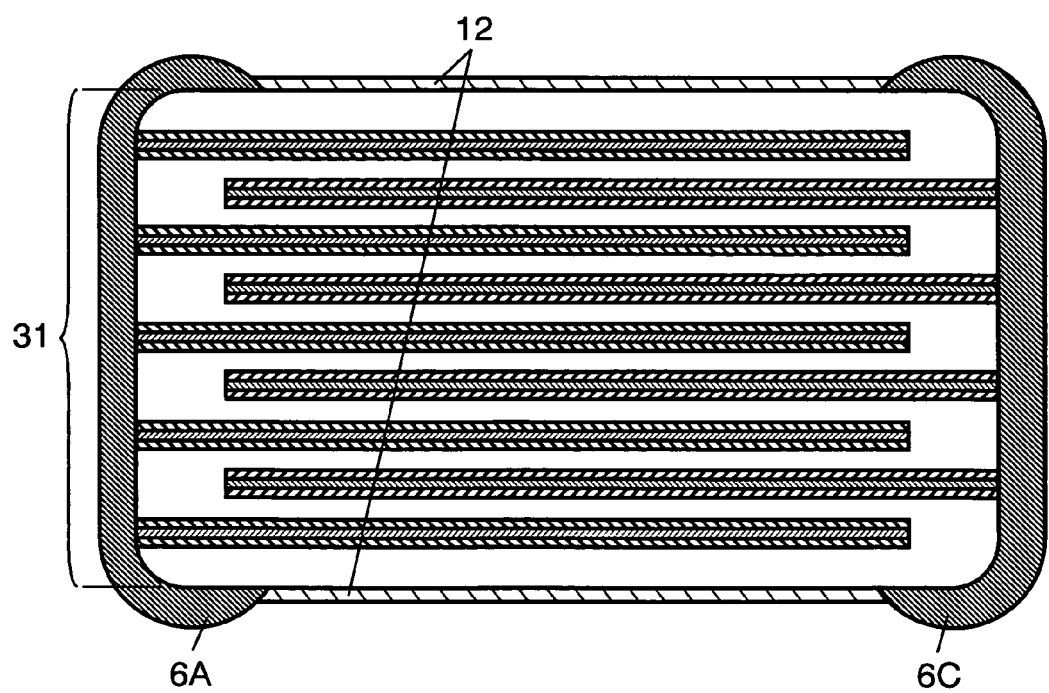
FIG. 21 is a sectional view of another all-solid-state lithium secondary cell in accordance with the second exemplary embodiment of the present invention.

As shown in FIG. 21, portions exposed from external current collectors 6A and 6C around laminate 31 are preferably sealed with seals 12 made of at least one of glass frit and resin.

As the same as the first exemplary embodiment, before R-chamfered shapes 32C are formed, green chip 32 is preferably dried to decrease the remaining amount of plasticizer. As the same as the first exemplary embodiment, when R-chamfered shapes 32C are formed, the laminate is preferably ground with a powder abrasive made of the same material used as solid electrolyte 1.

Additionally, in place of R-chamfered shapes 31C, planar chamfered shapes can be provided. The preferable ranges of the curvature radiuses of R-chamfered shapes 31C and the chamfered widths of the chamfered shapes are the same as those of the first exemplary embodiment.

When laminated sheet 33 is formed as above, preferably, green sheet 1G of the solid electrolyte is disposed in the outermost layer to form the layer of solid electrolyte 1 in the outermost layer of laminate 31. This is because making the portions in which R-chamfered shapes 31C or chamfered shapes are provided out of solid electrolyte 1 increases chamfering reliability.

The advantages of this exemplary embodiment are described using specific examples. First, using a positive electrode active material slurry having the same composition as sample A, green sheets 2G of the positive electrode active material, each being 1.5 mm wide, 6.8 mm long, and 3 μm thick, are formed on carrier film 7. On the other hand, using a current collector paste slurry essentially consisting of palladium, green sheets 2H of a positive electrode current collector, each having the same size as green sheet 2G and a thickness of 5 μm, are formed on carrier film 7, as shown in FIG. 13. The space between green sheets 2G in the longitudinal direction is 0.4 mm and that in the width direction 0.3 mm.

On the other hand, using a negative electrode active material slurry having the same composition as sample A, green sheets 3G of the negative electrode active material, each having the same size as green sheet 2G and a thickness of 5 μm, are formed on carrier film 7 at the same pith as green sheets 2G. On the other hand, using a current collector paste slurry essentially consisting of palladium, green sheets 3H of a negative electrode current collector, each having the same size as green sheet 3G and a thickness of 5 μm, are formed on carrier film 7, as shown in FIG. 15.

Further, though not shown, solid electrolyte slurry having the same composition as sample A is applied to carrier film 7 and dried, to provide green sheet 1G of the solid electrolyte of 25 μm thick.

Successively, as shown in FIG. 16, green sheet 3G of the negative electrode active material is placed on green sheet 1G of the solid electrolyte formed on carrier film 7, and the resulting laminate is pressurized at an ambient temperature of 70° at a pressure of 80 kg/cm². Thereafter, carrier film 7 in contact with green sheet 3G is peeled away from green sheet 3G, and green sheet 3G is placed on green sheet 1G. In a similar manner, green sheet 3H of a negative electrode current collector is placed on green sheet 3G, and green sheet 3G is further placed on green sheet 3H. Thus, negative electrode laminate green sheet 10 is produced.

On the other hand, as shown in FIG. 17, green sheet 2G of the positive electrode active material is placed on green sheet 1G of the solid electrolyte formed on carrier film 7, and the resulting laminate is pressurized at an ambient temperature of 70° at a pressure of 80 kg/cm². Thereafter, carrier film 7 in contact with green sheets 2G is peeled away from green sheet 2G, and green sheet 2G are placed on green sheet 1G. In a similar manner, green sheet 2H of a positive electrode current collector is placed on green sheet 2G, and green sheets 2G is further placed on green sheet 2H. Thus, positive electrode laminate green sheet 11 is produced.

Next, as shown in FIG. 18, polyester film 5 with an adhesive is applied on support 4, and green sheet 1G of the solid electrolyte formed on carrier film 7 is placed on the polyester film. Negative electrode laminate green sheet 10 formed on carrier film 7 is further placed on green sheet 1G, and the resulting laminate is pressurized at an ambient temperature of 70° at a pressure of 80 kg/cm². Thereafter, carrier film 7 is peeled away from negative electrode laminate green sheet 10. Positive electrode laminate green sheet 11 formed on carrier film 7 is further placed on negative electrode laminate green sheet 10, and the resulting laminate is pressurized at an ambient temperature of 70° at a pressure of 80 kg/cm². Thereafter, carrier film 7 is peeled away from positive electrode laminate green sheet 11. Theses operations are repeated a predetermined number of times and, finally, negative electrode laminate green sheet 10 and green sheet 1G are laminated in this order. Thus, is obtained laminated sheet 33 in which patterns, each made of green sheet 2H, green sheet 2G, green sheet 1G, green sheet 3G, and green sheet 3H, are repeated.

Next, laminated sheet 33 is cut into pieces. Polyester film 5 is peeled away from each of the resulting pieces to provide green chip 32 shown in FIG. 19A. Next, the edges and ridges 32A of green chip 32 are ground to form R-chamfered shapes 32C as shown in FIG. 20. Then, the chip is washed and dried, and the binder thereof is removed in a sintering furnace. Thereafter, the temperature is further increased to sinter green chip 32, and promptly cooled to room temperature. In this manner, laminate 31 shown in FIG. 11 is obtained. Laminate 31 measures approx. 3.2 mm wide, approx 1.6 mm deep (long), and approx. 0.9 mm high.

Finally, a paste made of an electrically-conductive powder and thickener is applied to both ends of laminate 31 to support the side faces of laminate 31, and baked. In this manner, external current collectors 6A and 6C are formed. The conditions for drying green chip 32, removing the binder of laminate 31, sintering the laminate, and baking external current collectors 6A and 6C are the same as those for sample A of the first exemplary embodiment. In this manner, the laminated all-solid-state lithium secondary cells (laminated cells) of sample AA are obtained.

Next, a procedure of producing cells of samples AB is described. After green chips 32 as shown in FIG. 19A are produced in a manner similar to sample AA, the edges and ridges 32A are ground by an end-face grinder using alumina as an abrasive, to provide chamfered shapes 45 μm wide. After that, the same procedure of producing sample AA is performed to obtain the laminated cells of sample AB.

In the production of cells of sample AC, except that R-chamfered shapes 21C are formed in the cells of samples AA immediately after green chips 32 are sintered, the same procedure of producing sample AA is performed to obtain the laminated cells of sample AC.

In the production of cells of sample AD, except that chamfered shapes are formed in the cells of samples AB immediately after green chips 32 are sintered, the same procedure of producing sample AB is performed to obtain the laminated cells of sample AD.

In the production of the cells of samples AE through AH, except that R-chamfered shapes 32C are formed to have curvature radiuses of 20, 100, 170, and 200 μm, respectively, in the cells of sample AA, the same procedure of producing sample AA is performed to obtain the laminated cells of sample AE through AH.

In the production of cells of samples AJ through AM, except that chamfered shapes are formed to have chamfered widths of 35, 150, 210, and 250 μm, respectively, in the cells of samples AJ through AM, the same procedure of producing sample AB is performed to obtain the laminated cells of sample AJ through AM.

In the production of the cells of samples AN through AR, except that R-chamfered shapes 31C are formed to have curvature radiuses of 20, 100, 170, and 200 μm, respectively, in the cells of sample AC, the same procedure of producing sample AC is performed to obtain the laminated cells of sample AN through AR.

In the production of the cells of samples AS through AV, except that chamfered shapes are formed to have chamfered widths of 35, 150, 210, and 250 μm, respectively, in the cells of sample AD, the same procedure of producing sample AD is performed to obtain the laminated cells of sample AS through AV.

Figure 22:
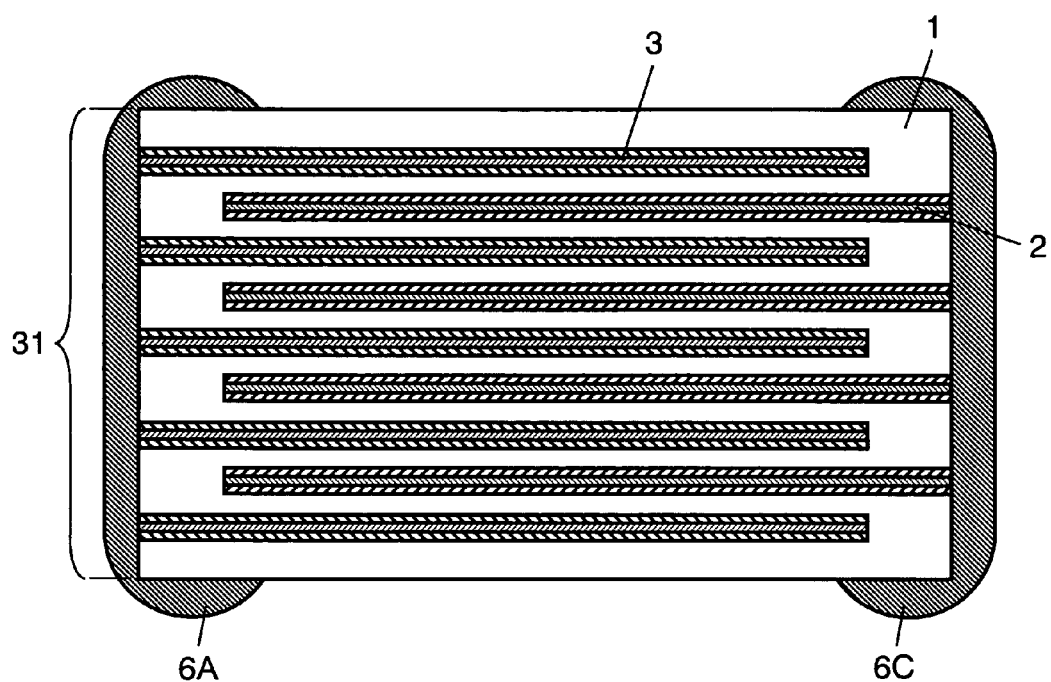
FIG. 22 is a sectional view of an all-solid-state lithium secondary cell of comparative example B.

For comparison with these samples, comparative example B of laminates without any chamfering at the edges or along the ridges thereof as shown in a schematic sectional view of FIG. 22 is produced.

Three point bending test are conducted on these laminated cells according to JIS-R1601 in a manner similar to sample A to measure transverses thereof. Mounting tests are also conducted to examine defective fractions of mounting. Tables 4 and 5 show the results.

TABLE 4

| Sample | Curvature Radius (μm) | Chamfering | Transverse (Mpa) | Defective fraction (%) |
|---|---|---|---|---|
| AE | 20 | Before sintering | 102 | 2 |
| AA | 30 | | 129 | 0 |
| AF | 100 | | 126 | 0 |
| AG | 170 | | 138 | 0 |
| AH | 200 | | 141 | 0 |
| AN | 20 | After sintering | 90 | 0 |
| AC | 30 | | 115 | 0 |
| AP | 100 | | 112 | 0 |
| AQ | 170 | | 124 | 0 |
| AR | 200 | | 137 | 0 |
| Comparative B | — | — | 62 | 7 |

TABLE 5

| Sample | Chamfered width (μm) | Chamfering | Transverse (Mpa) | Defective fraction (%) |
|---|---|---|---|---|
| AJ | 35 | Before sintering | 94 | 1 |
| AB | 45 | | 104 | 0 |
| AK | 150 | | 114 | 0 |
| AL | 210 | | 122 | 0 |
| AM | 250 | | 124 | 0 |
| AS | 35 | After sintering | 79 | 0 |
| AD | 45 | | 106 | 0 |
| AT | 150 | | 106 | 0 |
| AU | 210 | | 107 | 0 |
| AV | 250 | | 114 | 0 |
| Comparative B | — | — | 62 | 7 |

The results of Tables 4 and 5 show a similar tendency to Tables 1 and 2 of the first exemplary embodiment. That is, the laminated cells of all of the samples which have R-chamfered shapes 31C or the chamfered shapes at the edges or along ridges 31A provide a higher transverse as compared with the laminated cell of comparative example B. Providing R-chamfered shapes 32C or the chamfered shapes before sintering green chips 32 further increases the transverses.

However, in samples AE and AN that have R-chamfered shapes 31C having a curvature radius of 20 μm, and samples AJ and AS having a chamfered width of 35 μm, transverses so high as expected are not obtained. On the other hand, in samples AH and AR having a curvature radius exceeding ⅕ the thickness (0.9 mm) of laminate 31 in the laminated direction, sufficient transverses are obtained; the thickness is measured without taking R-chamfered shapes 31C into consideration. However, the small plane portions thereof make still standing difficult. This is the same in samples AM and AV having chamfered widths exceeding ¼ of the thickness of laminate 31 in the laminated direction; the thickness is measured without taking chamfered shapes into consideration. Still standing property is one of essential requirements of a cell to be mounted on a circuit board. For this reason, preferably, the curvature radius of laminate 31 is up to ⅕ the thickness of laminate 31 in the laminated direction; the thickness is measured without taking R-chamfered shapes 31C into consideration. For the same reason, preferably, the chamfered width is up to ¼ the thickness of laminate 31 in the laminated direction; the thickness is measured without taking chamfered shapes into consideration.

For defective fractions of mounting, as shown in Tables 4 and 5, a defective fraction of 7% occurs in laminated cells without any chamfering in the edges or along the ridges of comparative example B. This is considered because thin external current collectors 6A and 6C at the edges or along the ridges locally expose laminate 31, and thus decrease solder wettability. On the other hand, as shown by samples AA through AV, providing R-chamfered shapes 31C or the chamfered shapes at the edges or along ridges 31A can decrease mounting failures. Further, when the curvature radius of R-chamfered shapes 31C is 30 μm or larger or the chamfered width is 45 μm or larger, defective fractions of mounting can be made zero regardless of the order of steps in the sintering process of green chip 32.

As described above, a laminated cell having R-chamfered shapes 31C or the chamfered shapes at the edges or along ridges 31A exhibits a high transverse. This structure can also decrease defective fractions of mounting, which is important in mounting a cell on a circuit board.

Next, are described the results obtained by examining the remaining amount of plasticizer in green chip 32 which is dried under different conditions before R-chamfered shapes 32C are formed at the edges 32B or along ridges 31A of green chip 32. In production of samples AW through AY, laminated cells of sample AA are dried at temperatures of 150, 180, and 50° C., respectively, before R-chamfered shapes 32C are formed. Drying the laminated cells at the respective temperatures for 30 minutes makes the remaining amounts of the plasticizer to 50, 20, and 99 wt. %. Except using such green chips 32, the same procedure of producing sample AA is performed to produce the laminated cells of samples AW, AX, and AY. On the other hand, in the production of sample AZ, green chips 32 are not dried before R-chamfered shapes 32C are formed in laminated cells of samples AA. In other words, the remaining amount of the plasticizer is set to be 100 wt. %. Except setting the remaining amount to be 100 wt. %, the same procedure of producing sample AA is performed to produce laminated cells of sample AZ.

When sample AZ is ground, no visible cracks or peels are observed. However, for some cells of the sample, impurities generated during grinding adhere to the surfaces thereof due to the influence of resin components contained each green sheet. This is considered because viscosity of the green chip causes components to adhere to each other when R-chamfered shapes 32C are formed. On the other hand, when sample AX is ground, visible cracks and peels in green chips 32 are observed in some cells at a probability of 5%. This is considered because excessive drying brittles green chips 32. Such failures are not confirmed in samples AA, AW, and AY having a remaining amount of the plasticizer ranging from 25 to 99 wt. % (inclusive). According to these results, the remaining amount of the plasticizer is preferably controlled in the range of 25 to 99 wt. % (inclusive) by drying before grinding. This tendency is also confirmed when the green chips are chamfered by grinding.

Next, the results obtained by examining the influence of abrasives on materials are described. In production of sample AA, a powder made of a material same as solid electrolyte 1 is used as an abrasive, when R-chamfered shapes 32C are provided at edges 32B or along ridges 32A of green chips 32. Except using this abrasive, the same procedure of producing sample AA is performed to obtain laminated cells of sample BA. In production of sample BB, a powder made of a material same as solid electrolyte 1 is used as an abrasive, when chamfered shapes are provided at edges 32B or along ridges 32A of green chips 32 produced like sample AB. Except using this abrasive, the same procedure of producing sample AB is performed to obtain laminated cells of sample BB.

Table 6 shows the discharge capacities of each of these cells. The cells are charged at a dew point of −50° C. and at an ambient temperature of 25° C., at a constant current of 10 μm to 2.2V and discharged to 1.0V.

TABLE 6

| Sample | Abrasive | Chamfering at edges and along ridges | Discharge capacity (μAh) |
| --- | --- | --- | --- |
| AA | Alumina | R-chamfered | 5.5 |
| BA | Solid electrolyte | | 5.9 |
| AB | Alumina | Chamfered | 5.5 |
| BB | Solid electrolyte | | 5.9 |

As shown in Table 6, samples BA and AB which are obtained using solid electrolyte as an abrasive have more improved discharge capacities than those of samples AA and AB which are obtained using an ordinary abrasive of alumina. One of the reasons why the above results are obtained is considered as following: in samples AA and AB, charge and discharge reactions are limited by contamination of alumina, while in samples BA and BB, the cell performance is not limited by contamination because the contaminant is solid electrolyte.

Next, the advantages of seals 12 shown in FIG. 21 are described. In production of sample CA, a paste made of glass frit is applied to portions not covered with external current collectors 6A and 6C and sintered at a reducing atmosphere of 400° C. for one hour, to provide seals 12. Thus, laminated cells of sample CA are obtained.

In production of sample CB, a paste made of glass frit is further applied to portions not covered with external current collectors 6A and 6C of cells of samples AB and sintered at a reducing atmosphere of 400° C. for one hour, to provide seals 12. Thus, laminated cells of sample CB are obtained.

In production of sample CC, a water-resistant epoxy resin is further applied to portions not covered with external current collectors 6A and 6C of laminated cells of samples AA, to provide seals 12. Thus, laminated cells of sample CC are obtained.

After these cells in the charged state are stored in a thermostatic humidistat bath at a temperature of 60° C. and a humidity of 85% for 30 days, each cell is discharged. The discharge capacity of each cell is measured. Table 7 shows the results. The cells are charged at a dew point of −50° C. and at an ambient temperature of 25° C. at a constant current of 10 µA to 2.2 V and discharged to 1.0 V.

TABLE 7

| Sample | Chamfering at edges and along ridges | Seal | Discharge capacity (µAh) |
|---|---|---|---|
| AA | R-chamfered | — | 4.9 |
| CA | | Glass | 5.5 |
| CC | | Epoxy resin | 5.3 |
| AB | Chamfered | — | 4.7 |
| CB | | Glass | 5.4 |

In contrast to samples AA and AB without seals 12, it is confirmed that samples CA and CB with seals 12 made of glass frit have a larger discharge capacity after storage and thus excellent storage characteristics. This advantage is also confirmed in sample CC using an epoxy resin for seals 12. In this manner, providing seals 12 made of chemically stable materials can increase the storage characteristics of the cells of this exemplary embodiment.

As described above, an all-solid-state lithium secondary cell of the present invention is capable of improving the reliability thereof, and has a high industrial applicability in such a field of mounting the cell on a circuit board.

What is claimed is:

1. An all-solid-state lithium secondary cell comprising:
    a laminate shaped into substantially a rectangular parallelepiped having one of a chamfered shape or an R-chamfered shape at four corners and four side lines of the laminate, the laminate comprising:
    a positive electrode containing a positive electrode active material; a negative electrode containing a negative electrode active material; and a solid electrolyte between the positive electrode and the negative electrode; and
    a pair of external current collectors disposed at both ends of the laminate to support side faces of the laminate, one of the current collectors being coupled to the positive electrode and another of the current collectors being connected to the negative electrode, wherein
    in a cross section of the laminate along a stacked direction of the positive electrode, the negative electrode and the solid electrolyte, four corners of the cross section of laminate has one of a chamfered shape or an R-chamfered shape.

2. The all-solid-state lithium secondary cell of claim 1, wherein the positive electrode includes a positive electrode current collector and the positive electrode active material provided on the positive electrode current collector, and the negative electrode includes a negative electrode current collector and the negative electrode active material provided on the negative electrode current collector.

3. The all-solid-state lithium secondary cell of claim 2, wherein the positive electrode is one of a plurality of positive electrodes, the negative electrode is one of a plurality of negative electrodes, the solid electrolyte is one of a plurality of solid electrolytes, and the laminate includes a plurality of elemental units, each comprising one of the plurality of positive electrodes, one of the plurality of negative electrodes, and one of the plurality of solid electrolytes.

4. The all-solid-state lithium secondary cell of claim 3, wherein a layer made of a material same as the solid electrolyte is in an outermost layer of the laminate.

5. The all-solid-state lithium secondary cell of claim 1, wherein a curvature radius of the R-chamfered shape is smaller than ⅕ a length of the laminate in a laminated direction and is at least 30 µm.

6. The all-solid-state lithium secondary cell of claim 1, further comprising a seal including at least one of a glass and a resin mold for sealing a portion exposed from the external current collectors of the laminate.

7. A method of manufacturing an all-solid-state lithium secondary cell, the method comprising:
    (A) producing a laminate that has substantially a rectangular parallelepiped shape and one of a chamfered shape or an R-chamfered shape at four corners and four side lines of the laminate, by stacking a positive electrode, a negative electrode, and a solid electrolyte; and
    (B) disposing external electrodes at both ends of the laminate to support side faces thereof, wherein
    the laminate is produced so that in a cross section of the laminate along a stacked direction of the positive electrode, the negative electrode and the solid electrolyte, four corners of the cross section of laminate has one of a chamfered shape or an R-chamfered shape.

8. The method of producing the all-solid-state lithium secondary cell of claim 7, wherein step (A) includes sub-steps:
    (1) producing green sheets of the positive electrode active material, positive electrode current collector, negative electrode active material, negative electrode current collector, and solid electrolyte separately;
    (2) sequentially laminating each of the green sheets of the positive electrode current collector, positive electrode active material, solid electrolyte, negative electrode active material, and negative electrode current collector in this order, to produce a laminated sheet;
    (3) cutting the laminated sheet to provide a green chip;
    (4) forming four corners and four side lines of the green chip into one of the chamfered or R chamfered shapes; and
    (5) sintering the green chip after sub-step (4) to provide the laminate.

9. The method of producing the all-solid-state lithium secondary cell of claim 8, further including, after sub-step (3), drying the green chip so that an amount of a plasticizer remained in the green chip is at least 25 weight % and at most 99 weight % based on an amount of the plasticizer before drying.

10. The method of producing the all-solid-state lithium secondary cell of claim 8, wherein the four corners and the four side lines of the green chip are ground in sub-step (4).

11. The method of producing the all-solid-state lithium secondary cell of claim 10, wherein a powder made of a material same as the solid electrolyte is used as an abrasive in sub-step (4).

12. The method of manufacturing the all-solid-state lithium secondary cell of claim 8, wherein the laminated sheet is produced by repeating laminating operations a plurality of times in sub-step (2), and in each laminating operation, green sheets of the solid electrolyte, the negative electrode active material, the negative electrode current collector, the negative electrode active material, the solid electrolyte, the positive electrode active material, the positive electrode current collector, and the positive electrode active material are each sequentially laminated in this order.

* * * * *